United States Patent Office.

DAVID L. BARTLETT AND GERMAN H. HUNT, OF BALTIMORE, MARYLAND, ASSIGNEES OF STUART GWYNN.

*Letters Patent No.* 51,584, *dated December* 19, 1865; *antedated December* 5, 1865; *reissue No.* 2,624, *dated May* 28, 1867.

DIVISION B.

IMPROVEMENT IN THE MANUFACTURE OF OPAQUE PIGMENTS.

The Schedule referred to in these Letters Patent and making part of the same.

Be it known that I, STUART GWYNN, of the city, county, and State of New York, have invented a certain new and useful Process for Manufacturing Pigments, which consists in crushing and comminuting the normal particles of the matter employed, changing the atomic structure thereof, and rendering it more opaque; and I declare the following to be a true specification and description of said process.

The machinery employed in conducting said process I intend hereafter to protect by Letters Patent, and shall therefore no further describe it herein than is necessary to make my description of the process clear and intelligible.

In all pigments extreme comminution of the particles of matter is a great object. Economy in the consumption of the materials, brilliancy and delicacy of tint, and durability, all in a great degree depend upon this quality. My process secures all the advantages of the finest practical pulverization at a small price.

First, I take the ordinary pigments of commerce and thoroughly purify them. This purification is in all cases effected by the employment of heat. The degree of heat and the other influences and manipulations used vary with the qualities of the pigment treated. I place the pigment in a proper vessel, where, if desired, it can be stirred, and subject it to heat according to the nature of the material. For example, carmine I subject to 100° Fahrenheit; aniline colors, to from 250° to 400°; oxide of zinc, arsenical and chrome colors, to about 500°; carbon colors, to 600°; sulphate of lead and carbonate of lead, to about 800°; iron oxides and some other metallic paints, to about 1,000°. In all cases the degree of heat must depend upon the pigment treated. The object being to effect thorough purification, any one skilled in pigments will know the degree of heat an article will bear without injury, and the highest degree short of producing injurious effects is the best. While the pigment is heated as above described, I inject into and through it superheated steam, heated air, gases, vapors, or fluids, to expel, neutralize, or change the gaseous, watery, or oleaginous or other impurities. The article thus injected into and through the pigment must be selected by the operator according to the nature of the impurities contained in the matter treated. This injection is recommended to facilitate the purification, and the more readily to expel the foreign matters contained in the crude article. Any one skilled in the treatment of pigments will understand what impurities exist in each, and what should be injected to effect their expulsion. For example, into pigments heated respectively as hereinbefore stated, I have found it best to inject the following, viz: Into oxide of zinc, Prussian blue, ultramarine blue, I find superheated steam to answer the purpose; so, also, into sulphate of lead and the iron oxides. Carmine is best purified by the aid of ammoniacal gas. For aniline colors ether is best. Arsenical colors and chrome colors, oxygenized air will purify. Carbon colors, including lampblack, can generally be cleansed by injecting hot air, but in some cases turpentine vapor is necessary. Carbonate of lead requires carbonic acid gas. The injection must be of such nature as to destroy or expel the impurities of the pigment, and must be selected with this view. The above examples will show to any skilled operator what is required. To such a person, the impurities of the pigment being known, it will readily appear what injection is required, if any. The injected fluid should be of nearly the same temperature with the pigment at the time of injection, but to prevent condensation, which would in many cases be very deleterious, it should be one or two degrees lower. It is advantageous to stir the mass while being heated and subjected to injection as above named, to effect a more speedy and thorough purification. When all foreign matters have been expelled, and the mass is rendered as nearly as practicable perfectly pure, it is ready for the next stage of my process.

Second, I take the purified pigment, while still in its heated condition, and subject it to a pressure varying from two to eight tons to the square inch, until the atoms or normal molecules are crushed and comminuted and the mass rendered opaque. This is done by placing the mass in elastic bags confined in strong apparatus, or in strong cylindrical vessels, or in open-ended steel tubes, producing the pressure by means of hydraulic, pneumatic, or mechanical presses. However the pressure may be effected, it must be sufficient to pulverize and crush the normal atoms or molecules of the pigment and render the whole more opaque. It will be seen that as the atoms or particles of the pigment are multiplied in number and reduced in size, the coat of paint may be thinner and more brilliant, as it will be much more opaque in proportion to its thickness.

Pigments treated after this process have much greater specific gravity than when in a normal condition, so much so that one thousand pounds of the former will not require more space than two hundred or two hundred and fifty pounds of the latter.

The first part of my process, the purification by removing impurities, brings the atoms or molecules of the pigment into such a condition that the pressure crushes and pulverizes them.

In some cases I, for convenience, press the pigment before heating, say applying one thousand or two thousand pounds to the inch, but this is not essential; it only facilitates the operation.

The amount of pigment to which pressure is applied at one time should not be so great that the friction of the material against the sides of the vessel should materially diminish the force of the press. In most cases the material when pressed should not make a mass of over eight to twelve inches in thickness.

What I claim, and desire to protect by Letters Patent, is—

The process of manufacturing opaque pigments by crushing and pulverizing the normal atoms or molecules, substantially as herein described.

STUART GWYNN.

Witnesses:
WILLIAM STANDISH,
GEORGE BOOTH.